United States Patent [19]

Slack et al.

[11] Patent Number: 5,496,472
[45] Date of Patent: Mar. 5, 1996

[54] METHOD AND APPARATUS FOR DENITRIFICATION OF WASTEWATER

[75] Inventors: David C. Slack; Gregory A. Ellard, both of Tampa, Fla.

[73] Assignee: Tetra Technologies, Inc., The Woodlands, Tex.

[21] Appl. No.: 170,531

[22] Filed: Dec. 20, 1993

[51] Int. Cl.$^6$ .................................................. C02F 3/00
[52] U.S. Cl. ..................... 210/605; 210/150; 210/247; 210/617; 210/903; 405/80; 405/108
[58] Field of Search ................................. 210/456, 610, 210/616, 617, 248, 903, 247, 150, 605; 405/108, 107, 80

[56] References Cited

U.S. PATENT DOCUMENTS

| | | |
|---|---|---|
| 1,050,930 | 1/1913 | Edge et al. . |
| 1,995,367 | 3/1935 | Stewart . |
| 2,529,141 | 7/1947 | Danel . |
| 2,762,202 | 9/1956 | Ponsar ................................. 405/108 |
| 3,234,123 | 2/1966 | Hinde . |
| 3,293,174 | 12/1966 | Robjohns . |
| 3,651,607 | 3/1972 | Lee, II .................................. 210/248 |
| 3,709,364 | 1/1973 | Savage . |
| 3,713,543 | 1/1973 | Heaney . |
| 3,835,038 | 9/1974 | Heaney . |
| 3,853,752 | 12/1974 | Tymoszczuk . |
| 3,970,555 | 7/1976 | Savage et al. . |
| 3,994,803 | 11/1976 | Neff et al. . |
| 4,009,105 | 2/1977 | Jeris . |
| 4,035,290 | 7/1977 | Torpey . |
| 4,051,039 | 9/1977 | Heaney . |
| 4,056,465 | 11/1977 | Spector . |
| 4,064,050 | 12/1977 | Heaney et al. . |
| 4,159,945 | 7/1979 | Savage . |
| 4,162,153 | 7/1979 | Spector . |
| 4,179,374 | 12/1979 | Savage et al. . |
| 4,212,767 | 7/1980 | Daniel . |
| 4,332,904 | 6/1982 | Kurane et al. . |
| 4,351,729 | 9/1982 | Witt . |
| 4,488,967 | 12/1984 | Block et al. . |
| 4,488,968 | 12/1984 | Hong et al. . |
| 4,522,722 | 6/1985 | Nicholas . |
| 4,545,909 | 10/1985 | Atkinson et al. . |
| 4,564,449 | 1/1986 | Kampers ............................... 210/242.3 |
| 4,604,197 | 8/1986 | Louboutin et al. . |
| 4,650,585 | 3/1987 | Hong et al. . |
| 4,661,253 | 4/1987 | Williams ................................. 210/411 |
| 4,681,685 | 7/1987 | Sutton et al. . |
| 4,756,831 | 7/1988 | Menzel et al. . |
| 4,780,198 | 10/1988 | Crawford et al. . |
| 4,800,021 | 1/1989 | Desbos . |
| 4,816,145 | 3/1989 | Goudy, Jr. ............................... 210/243 |
| 4,874,519 | 10/1989 | Williamson . |
| 4,923,606 | 5/1990 | Gresh et al. . |
| 4,970,000 | 11/1990 | Eppler et al. . |
| 4,999,111 | 3/1991 | Williamson . |
| 5,022,993 | 6/1991 | Williamson . |
| 5,211,847 | 5/1993 | Kanow . |
| 5,288,407 | 2/1994 | Bodwell et al. ........................ 210/903 |

OTHER PUBLICATIONS

The TETRA DeepBed Denite® System.
*Water Pollution Control Federation Manual Of Practice #8,* "Activated Sludge".

Primary Examiner—Neil McCarthy
Assistant Examiner—Theodore M. Green
Attorney, Agent, or Firm—Tobor & Goldstein

[57] ABSTRACT

This invention relates to a method and apparatus of denitrification. The apparatus includes a weir block, a denitrification vessel having a wall surface, and filter media having microorganisms on their surfaces. The weir block may have a convex outer surface which is tangentially adjacent to and preferably contiguous with the upper end of the wall, whose lower end is in contact with the water in the denitrification vessel. The method may include passing the wastewater over the convex surface of the weir block, passing the water over the second surface of the substantially vertical wall and into the denitrification vessel while preferably maintaining substantially laminar flow and limiting the dissolved oxygen in the denitrification vessel, preferably to below about 5 mg/L and more preferably to below about 4 mg/L.

11 Claims, 2 Drawing Sheets

METHOD AND APPARATUS FOR DENITRIFICATION OF WASTEWATER

BACKGROUND

A. Field of Invention

This invention relates to the removal of contaminants, particularly nitrogen compounds, from aqueous solutions. More specifically, the invention relates to the removal of nitrates from wastewater by biological denitrification.

B. Related Art

A number of methods have been proposed for the denitrification of nitrate-containing aqueous solutions. In certain denitrification systems, wastewater is passed into a denitrification vessel that includes filter media having bacteria or microorganisms on their surfaces. An example of such a denitrification system is shown in U.S. Pat. No. 3,709,364, issued to Savage.

Generally, in such systems, ammonia in the wastewater is oxidized to nitrate-nitrogen, then biologically denitrified in filter media to nitrogen gas and released to the atmosphere. Periodically, the wastewater may be backwashed to remove suspended solids and nitrogen gas bubbles, which adhere to the filter media surfaces.

An important aspect of such systems is the carbon source for the denitrification reaction, which is typically methanol. It has been discovered that more dissolved oxygen in the wastewater results in more methanol or other carbon source being required for the denitrification reaction. Accordingly, there has been a continuing need to control or minimize the dissolved oxygen in the wastewater.

Some have proposed controlling the level of the water in the denitrification vessel. However, level control has a number of shortcomings. For example, when nitrogen release cycles are performed to release accumulated gas, each filter must either be drained of the accumulated water for long periods or face a forced overflow and recycling of large quantities of wastewater. For filters using anthracite coal as a filter medium, the filter boxes must also be drained to a minimum before the backwash can begin to minimize coal loss. Any excess water in the filter tends to increase drain down time and increase the period that the filter is not filtering. However, when level control is not used, dissolved oxygen increases. Accordingly, there exists a need to reduce dissolved oxygen without having to control or maintain the level of the wastewater in the denitrification vessel.

SUMMARY

This invention is directed to an apparatus and method for removing nitrates from wastewater. The denitrification apparatus includes at least one weir block having a convex outer surface, and a wall with a substantially planar vertical surface. Preferably, the weir block and wall are in adjacent contact with one another so that the convex surface is contiguous with the planar surface. More preferably, the planar surface is disposed in tangential relation to the convex surface so that water will flow from the convex surface and onto the planar surface, while maintaining laminar flow. The apparatus may also include a plurality of such weir blocks, positioned side-by-side on a wall that forms part of the denitrification vessel or tank.

The method includes passing the wastewater over a convex surface which is adjacent to a substantially vertical planar surface. In a specific embodiment, nitrate-containing wastewater is passed over the convex surface of a weir block and down the planar surface of a wall; then contacted with filter media to remove nitrates from the wastewater.

In a preferred aspect, the wastewater exhibits substantially laminar flow when passing over the two surfaces. It is contemplated that such laminar flow serves to limit the dissolved oxygen in the wastewater contained in the denitrification vessel, preferably to below about 5 mg/L and more preferably to below about 4 mg/L. In a preferred embodiment, the level of wastewater in the tank varies during denitrification and filtration cycles while the amount of dissolved oxygen remains substantially constant.

DETAILED DESCRIPTION OF THE INVENTION

Figure 2:
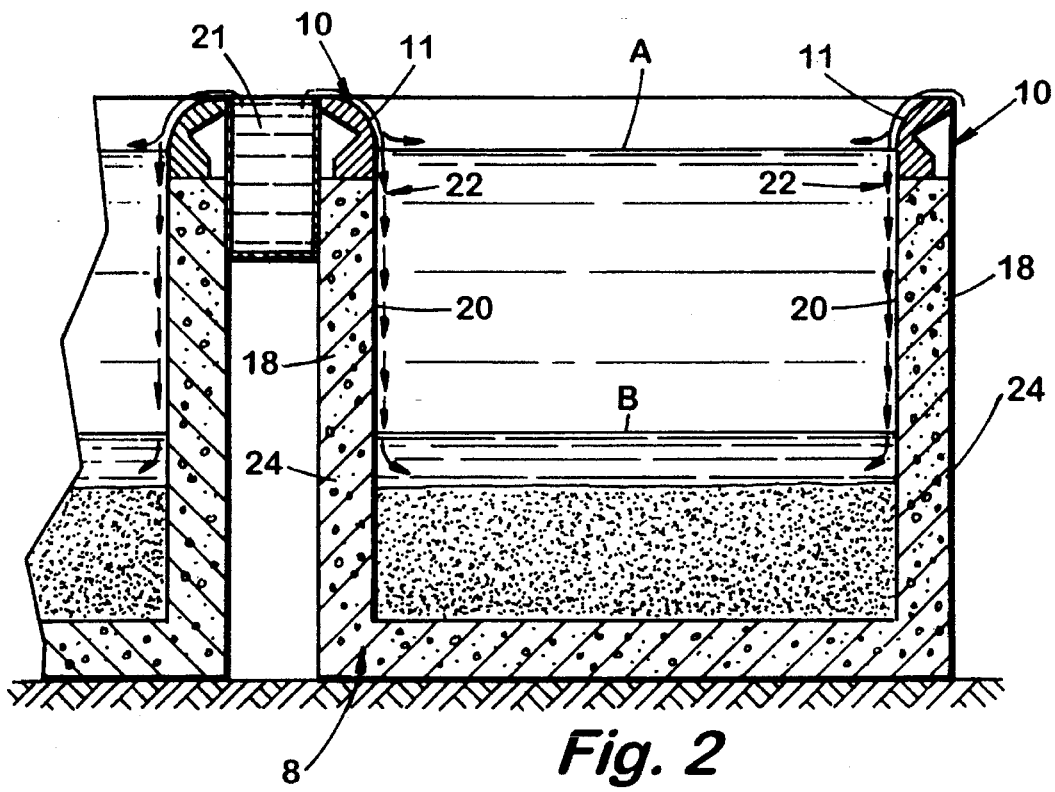
FIG. 2 is a side view of a denitrification apparatus of the invention.

In a broad aspect, the apparatus of the invention comprises a weir block which includes a convex outer surface. Referring to FIG. 2, the apparatus may also comprise both a weir block with a convex surface and a wall 18 having a planar, substantially vertical surface 20. The upper end 22 of the wall surface 20 should be adjacent to the lower end of the convex surface 11 of the weir block 10, and the lower end 24 of the wall should be in contact with the water in the denitrification vessel 8. The planar surface of the wall is preferably disposed in a tangential relationship to the convex surface of the weir block. More preferably, as shown in FIG. 2, the planar surface is in tangential contact with the convex surface, so that water may flow from one surface to the other.

Figure 1:
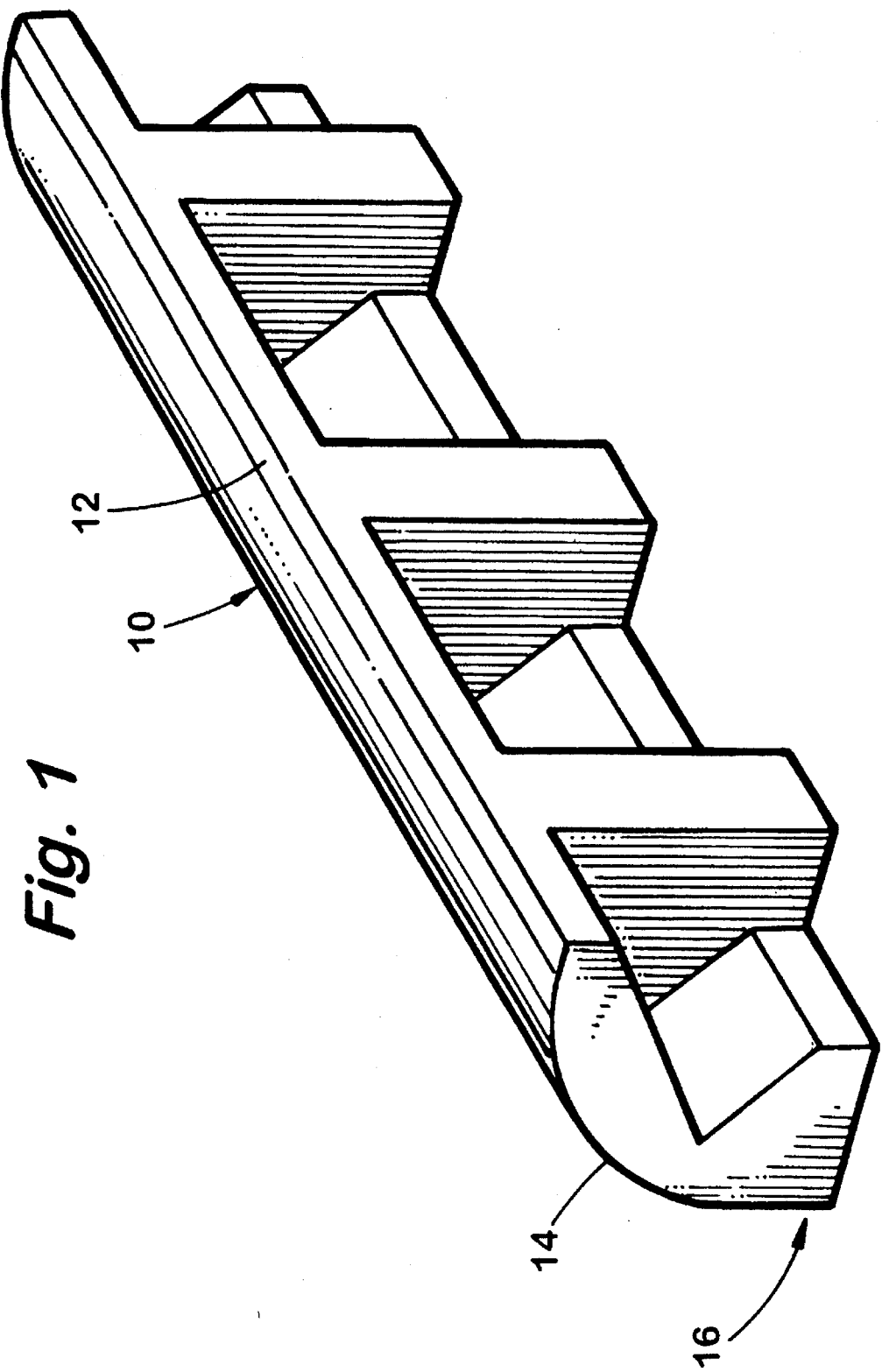
FIG. 1 is a perspective view of the weir block of the invention.

As shown in FIG. 1, the convex surface of the weir block preferably occupies approximately one quarter of the arc of an ellipse or circle. Although the entire outer surface 11 may be curved, alternatively only a portion of the outer surface may be curved. For example, referring to FIG. 1, the weir block surface may include three different surface portions, namely, an upper, middle and lower portion. The surface of the upper portion or crest 12 is substantially planar while the surface of the middle portion 14 of the block is arc-shaped. The surface of the lower portion 16 of the block is slightly curved, but becomes substantially planar towards the bottom where the weir block contacts the wall.

A specific embodiment of a weir block such as that in FIG. 1 may have a length of about 48 inches, a height of about 10 inches, a depth at the base ranging from about 4.5 inches on either end to about 8 inches for the middle legs. The arc of the convex portion 14 of the surface has a radius of about 7 inches. Lower portion 16 has a width of about 3 inches, and upper portion 12 has a width of about 1 inch.

It is preferred that substantially laminar flow be provided for any wastewater passing over the convex and planar surfaces. Accordingly, the weir block and wall should be in substantial contact with one another so that the convex surface of the block is contiguous with the planar surface of the wall, without any large spaces, gaps, or bumps between them. In this manner, liquid will tend to flow smoothly from one surface to the other in substantially laminar flow. As used herein, the term "laminar" refers to a streamlined or smooth flow of water, which tends to be held to the wall by at least some degree of adhesion. The laminar flowing water of this invention can be contrasted with free-falling water, which does not follow the surface of the wall as it enters the denitrification vessel.

In the embodiment shown in FIG. 2, a series of weir blocks 10 are placed side-by-side along the tops of the walls of the denitrification vessel, each weir block being shaped substantially as shown in FIG. 1. As illustrated in FIG. 2, it is contemplated that the present invention will limit dissolved oxygen in the system by reducing turbulence or agitation in the wastewater, which is caused by falling water. It is contemplated that reducing dissolved oxygen in the vessel will increase the effectiveness of the denitrification system and will decrease the methanol requirements. During the denitrification process, the incoming wastewater should not separate from the wall and splash into the water below, but rather should flow smoothly from the weir block surface to the wall surface and down the wall surface, preferably in substantially laminar flow. Then, the wastewater should enter the denitrification vessel, where it eventually will make contact with the filtration media. The contemplated flow of the wastewater over the weir blocks, down the wall and into the vessel is represented by arrows in FIG. 2.

In an aspect of this invention, the method includes the steps of passing wastewater across a convex surface of a weir block and contacting the wastewater with filter media. The surfaces of the filter media preferably include bacteria for denitrification of the wastewater. The method may also include the step of contacting the wastewater with methanol prior to contact with the bacteria. The steps of treating the wastewater, including aeration, settling and filtration, are discussed in U.S. Pat. No. 3,709,364, which is hereby incorporated by reference.

In a preferred embodiment, the method includes the step of passing or flowing the water over the convex weir surface, down the surface of a substantially vertical wall, and into the vessel containing the filter media for denitrification. As discussed above, the wastewater should preferably exhibit substantially laminar flow when passing over the two surfaces. It is contemplated that controlling the flow in accordance with this invention will limit the dissolved oxygen in the denitrification vessel, preferably to below about 5 mg/L and more preferably to below about 4 mg/L.

In a specific embodiment, the present invention reduces the dissolved oxygen content in the wastewater and thus also reduces the effect of oxygen on methanol consumption by the facultative-anaerobic microorganisms which grow on the surfaces of the filter media. The organisms convert nitrate and nitrite nitrogen to nitrogen gas when supplied with the carbon source methanol. The organisms also use dissolved oxygen for additional respiration when metabolizing the methanol. The filtration media may be dosed with methanol by, for example, charging methanol to the denitrification vessel from a storage tank.

In another aspect of the invention, the method includes a multi-level filtration cycle. As discussed in the background section, the level of the wastewater in denitrification vessels of other systems is often controlled to minimize turbulence caused by the contacting of the incoming wastewater with the wastewater already in the vessel. However, with the present invention, the smooth entrance of the incoming wastewater avoids the need for level control. Referring to FIG. 2, regardless of whether the water level is at level A or B, the incoming wastewater still enters smoothly without undue splashing. Further, the flow rate of water over the weir block may to some degree be increased without necessarily increasing the dissolved oxygen in the system.

Figure 3:
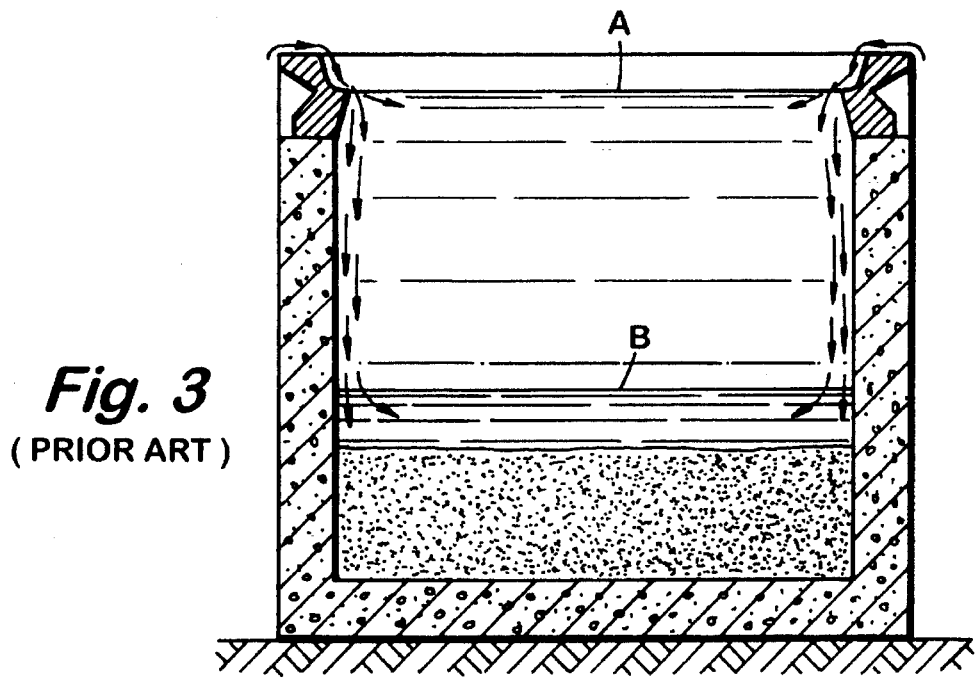
FIG. 3 is a side view of a prior art denitrification apparatus.

In contrast, in other systems such as those illustrated in FIG. 3, the incoming wastewater falls from the bottom of the weirs to the water surface, a distance which may be as much as 8 feet (depending on whether the surface is at level A or B). Above filter flows of about 1 gpm/ft$^2$ a significant portion of the water flow separates and ejects horizontally off the lower lip of the weirs (see FIG. 3). This creates splashing that is believed to add additional oxygen to the wastewater before it enters the filter bed.

Furthermore, in other systems, when a nitrogen release cycle (i.e., backwashing) is performed to release accumulated gas, each filter must either be drained of the accumulated water for a long period of time or face a forced overflow and recycling of large quantities of wastewater. Also, for filters using anthracite coal as a filter media, the filter boxes in the vessel must be drained to a minimum before the backwash can begin to minimize coal loss. Any excess water in the filter tends to increase drain down time and increase the period that the filter is not filtering.

Referring to FIG. 2, in a specific embodiment, the invention will be used to distribute flow from a channel 21 running along the wall of a square or rectangular vessel 8. The vessel 8 may alternatively be circular (not shown). Preferably, the flow from the channel 21 is distributed fairly evenly along the entire length of the channel. A broad-crested weir may be used to accomplish this if it has a horizontal surface within a calculable range of width at the top. The resistance to flow imposed by the horizontal surface helps the flow distribute evenly along the length of the weir. The weir illustrated in FIG. 1 includes such a horizontal or planar surface 12. Referring to the preferred dimensions for the weir block, which are discussed above, a width of approximately 1 inch should accommodate the anticipated range of wastewater flows for which the invention is intended.

The curved surface 14 of the weir block is designed to conduct flow from the horizontal surface 12 gradually to the vertical surface 16 so as to minimize separation of the underside of the flow from the surface. The vertical surface 16 is designed to provide a smooth transition to the edge of the vertical wall which the weir block will be mounted above and aligned with.

One of the advantages of this invention is that it is useful in applications besides those discussed herein. Accordingly, it is not intended that this invention be limited or restricted to the specific examples and embodiments described in this patent, which are merely intended to assist a person skilled in the art in practicing the invention. In particular, although the invention is preferably directed to the removal of nitrates by biological denitrification, it is not necessarily limited to such applications. For example, the invention may also be used to reduce methanol consumption in denitrification systems. It may also be used to limit dissolved oxygen in other types of filtration systems. The scope of the invention should be determined based on the claims below, including any equivalents thereof.

What is claimed:

1. A method of removing nitrates from wastewater, comprising passing the wastewater over a weir having an outer weir surface with a convex shape and along a wall of denitrification vessel, said denitrification vessel comprising filter media having microorganisms on their surfaces, said wall having an inner surface that is contiguous with the convex outer weir surface, to provide substantially laminar flow of liquid from the weir outer surface to the inner surface of the wall.

2. The method of claim 1, comprising multiple denitrification and filtration cycles wherein the level of wastewater in the vessel varies during said denitrification and filtration cycles and wherein the amount of dissolved oxygen in the wastewater remains substantially constant.

3. The method of claim 1 in which sufficient wastewater is passed over said outer weir surface to provide a level of dissolved oxygen in the denitrification vessel of below about 5 mg/L.

4. A method for removing nitrates from wastewater, comprising the steps of:

passing wastewater over the outer surface of a weir block, said outer surface having a convex shape;

passing the wastewater from said outer surface of said weir block over the surface of a substantially vertical wall and into a denitrification vessel; and contacting the wastewater with filter media having microorganisms on their surfaces;

said outer surface of said weir block being disposed in tangential relation to said surface of said substantially vertical wall.

5. The method of claim 2 wherein said step of passing the wastewater from said convex weir surface to said wall surface provides substantially laminar flow to said wastewater when entering the denitrification vessel.

6. A denitrification apparatus comprising a denitrification vessel for receiving wastewater having filter media with microorganisms on said filter media and a weir block having a convex outer surface, said weir block being configured such that the wastewater is capable of flowing over the convex outer surface and into the denitrification vessel, said denitrification vessel including a wall with an inner surface, wherein said convex outer surface of said weir block is contiguous with said inner surface of said wall, to provide substantially laminar flow of liquid from the weir outer surface to the inner surface of the wall.

7. A denitrification apparatus comprising a denitrification vessel having filter media with microorganisms on said filter media, a weir block with a convex outer surface and a wall with a substantially planar inner surface, wherein the upper end of the wall is adjacent to the convex surface of the weir block and the lower end of the wall is in contact with the wastewater in the denitrification vessel and wherein the inner surface of said wall is contiguous with the convex outer surface of the weir block, to provide substantially laminar flow of liquid from the weir outer surface to the inner surface of the wall.

8. The denitrification apparatus of claim 7 wherein the convex outer surface of said weir block and the substantially planar surface of said wall are disposed in tangential relation to one another.

9. The denitrification apparatus of claim 8 wherein said weir block and said wall are in adjacent contact with one another, such that water flowing over the convex surface of the weir block flows onto the planar surface of the wall.

10. The denitrification apparatus of claim 8 wherein said surfaces are configured so that wastewater passing over said convex and planar surfaces exhibits substantially laminar flow as it enters the denitrification vessel.

11. The denitrification apparatus of claim 7 comprising a plurality of said weir blocks, each having a convex outer surface, each positioned side-by-side on a wall that forms part of the denitrification vessel.

* * * * *